US010239616B2

(12) United States Patent
High et al.

(10) Patent No.: US 10,239,616 B2
(45) Date of Patent: *Mar. 26, 2019

(54) APPARATUS AND METHOD FOR PROVIDING PACKAGE RELEASE TO UNMANNED AERIAL SYSTEM

(71) Applicant: Walmart Apollo, LLC, Bentonville, AR (US)

(72) Inventors: Donald R. High, Noel, MO (US); Michael D. Atchley, Springdale, AR (US); John P. Thompson, Bentonville, AR (US); Chandrashekar Natarajan, Valencia, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,987

(22) Filed: Jul. 16, 2018

(65) Prior Publication Data

US 2018/0327095 A1    Nov. 15, 2018

Related U.S. Application Data

(63) Continuation of application No. 15/337,397, filed on Oct. 28, 2016, now Pat. No. 10,059,451.

(Continued)

(51) Int. Cl.
*B64D 9/00*     (2006.01)
*B64C 39/02*    (2006.01)
(Continued)

(52) U.S. Cl.
CPC ............. *B64D 9/00* (2013.01); *B64C 39/024* (2013.01); *B64D 1/22* (2013.01); *B60P 3/007* (2013.01);
(Continued)

(58) Field of Classification Search
CPC ... B64C 39/024; B64C 2201/128; B64D 1/22; B64D 99/00
See application file for complete search history.

(56) References Cited

U.S. PATENT DOCUMENTS 5,794,416 A    8/1998  Rahman
6,622,063 B1   9/2003  Moritz
(Continued)

FOREIGN PATENT DOCUMENTS

WO    2014080386    5/2014
WO    2014080389    6/2014
WO    2015150529    10/2015

OTHER PUBLICATIONS

PCT; App. No. PCT/US2016/058756; International Search Report and Written Opinion dated Dec. 29, 2016.
(Continued)

*Primary Examiner* — Philip J Bonzell
(74) *Attorney, Agent, or Firm* — Fitch, Even, Tabin & Flannery LLP

(57) ABSTRACT

Systems, apparatuses, and methods are provided herein for providing package release for an unmanned aerial system. An apparatus for releasing packages for retrieval by an unmanned aerial system comprises a plurality of arms configured to surround a plurality of packages stacked vertically in an extended position, a plurality of powered hinges at a base of each of the plurality of arms, and a control circuit coupled to the plurality of powered hinges. The control circuit being configured to: determine a height for a first lowered position for the plurality of arms at which the plurality of arms do not obstruct an unmanned aerial vehicle from coupling with a coupling structure on a first package of the plurality of packages positioned at a top of the plurality of packages, and cause the plurality of powered hinges to
(Continued)

pivot the plurality of arms from the extended position to the first lowered position.

20 Claims, 3 Drawing Sheets

Related U.S. Application Data

(60) Provisional application No. 62/247,409, filed on Oct. 28, 2015.

(51) Int. Cl.
  *B64D 1/22* (2006.01)
  *B60P 3/00* (2006.01)
(52) U.S. Cl.
  CPC .. *B64C 2201/027* (2013.01); *B64C 2201/108* (2013.01); *B64C 2201/128* (2013.01)

(56) References Cited

U.S. PATENT DOCUMENTS

| | | | |
|---|---|---|---|
| 2002/0168300 | A1 | 11/2002 | Bramwell |
| 2013/0259634 | A1 | 10/2013 | Raz |
| 2015/0120094 | A1 | 4/2015 | Kimchi |
| 2015/0175276 | A1 | 6/2015 | Koster |
| 2017/0313421 | A1 | 11/2017 | Gil |
| 2017/0313422 | A1 | 11/2017 | Gil |
| 2017/0316375 | A1 | 11/2017 | Gil |
| 2017/0316376 | A1 | 11/2017 | Cooper |
| 2017/0316701 | A1 | 11/2017 | Gil |

OTHER PUBLICATIONS

Miller, John; "Autonomous Quadcopter Launch and Retrieval System", Tech Briefs, http://contest.techbriefs.com/2015/entries/machinery-automation-robotics/5342, May 12, 2015, pp. 1-2.

Dronologista; "HorseFly unmanned aerial parcel delivery system uses truck as base", Robohub, http://robohub.org/horsefly-unmanned-aerial-parcel-delivery-system-uses-truck-as-base/, Jun. 11, 2014, pp. 1-3.

Wu, Chong, et al.; "Development of an unmanned helicopter automatic barrels transportation system", 2015 IEEE International Conference on Robotics and Automation, Seattle, Washington, May 26-30, 2015, pp. 1-6.

Menzel, Christoph; "Parcel Delivery Overhaul", May 2015, pp. 1-11.

USPTO; U.S. Appl. No. 15/337,397; Notice of Allowance dated Apr. 16, 2018 (pp. 1-9).

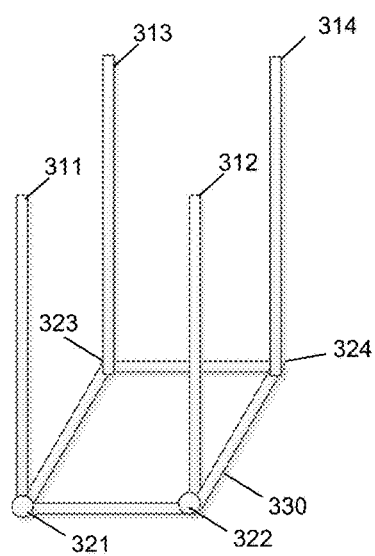
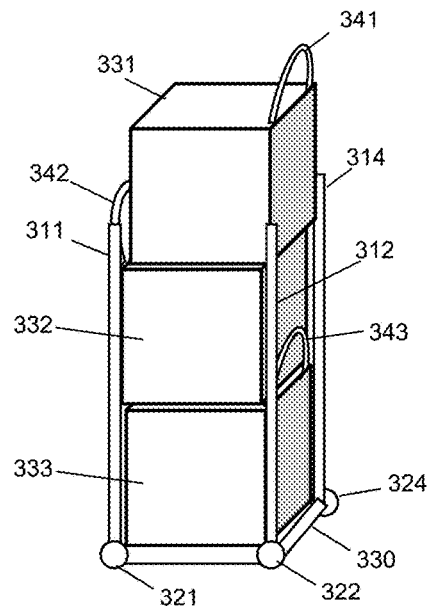
FIG. 3A
FIG. 3B
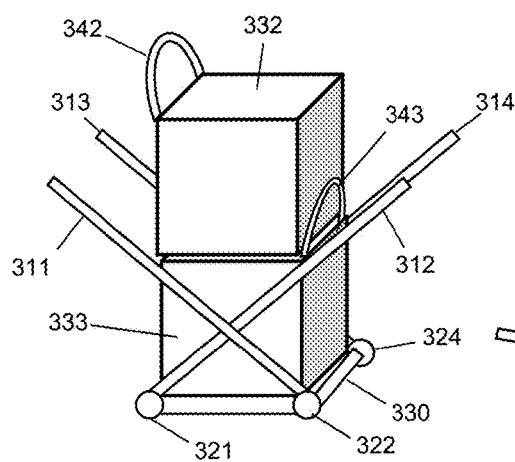
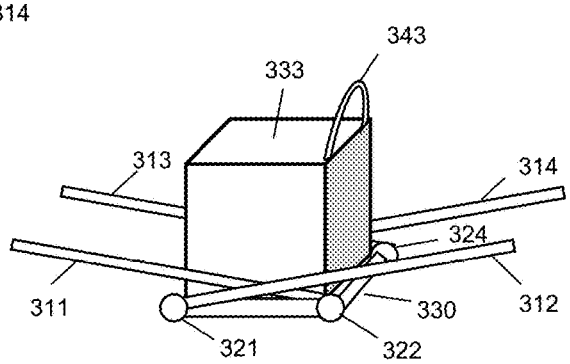
FIG. 3C
FIG. 3D

US 10,239,616 B2

APPARATUS AND METHOD FOR PROVIDING PACKAGE RELEASE TO UNMANNED AERIAL SYSTEM

CROSS-REFERENCE TO RELATED APPLICATION

This application is a continuation application of U.S. patent application Ser. No. 15/337,397, filed Oct. 28, 2016 which claims the benefit of U.S. Provisional Application No. 62/247,409, filed Oct. 28, 2015, both of which are incorporated herein by reference in their entireties.

TECHNICAL FIELD

This invention relates generally to package handling and delivery.

BACKGROUND

Unnamed aerial systems (UAS) generally refer to aircrafts without a human pilot onboard. Initially developed for the military, UASs are increasing being used for recreational and commercial applications.

BRIEF DESCRIPTION OF THE DRAWINGS

Disclosed herein are embodiments of apparatuses and methods for providing package release to unmanned aerial system. This description includes drawings, wherein:

FIGS. 3A, 3B, 3C, and 3D are illustrations of a package release system in accordance with several embodiments.

Figure 1:
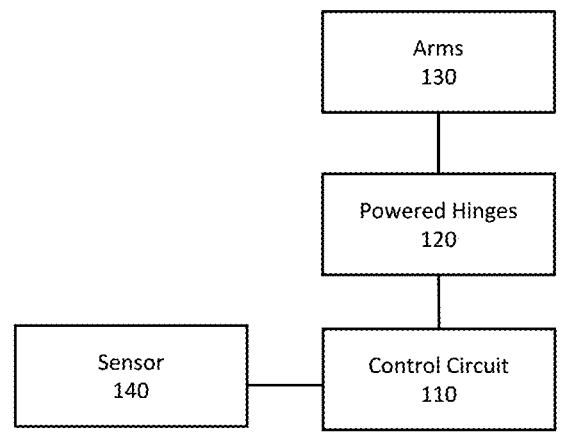
FIG. 1 is a block diagram of a system in accordance with several embodiments.
Figure 2:
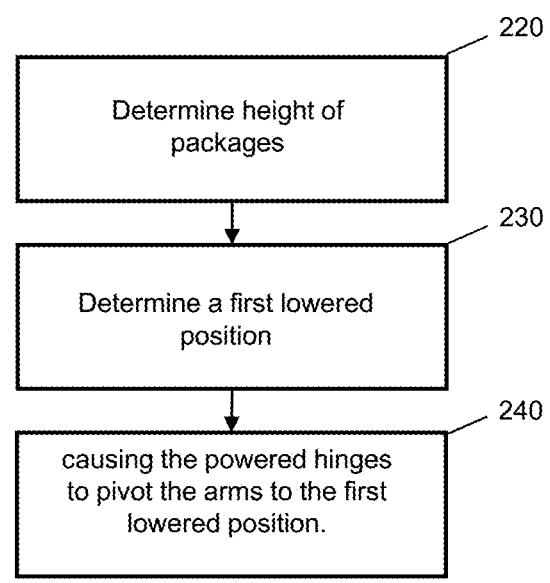
FIG. 2 is a flow diagram of a method in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for releasing packages for retrieval by an unmanned aerial system. An apparatus for releasing packages for retrieval by an unmanned aerial system comprises a plurality of arms configured to surround a plurality of packages stacked vertically in an extended position, a plurality of powered hinges at a base of each of the plurality of arms, and a control circuit coupled to the plurality of powered hinges. The control circuit being configured to: determine a height for a first lowered position for the plurality of arms at which the plurality of arms do not obstruct an unmanned aerial vehicle from coupling with a coupling structure on a first package of the plurality of packages positioned at a top of the plurality of packages, and cause the plurality of powered hinges to pivot the plurality of arms from the extended position to the first lowered position.

Aerial drones may be used for package delivery, but such systems include many challenges. Implementing a fully automated package delivery system that can attach to and release packages without significant human intervention includes many points of potential failures. For example, an aerial drone typically produces a downdraft which can blow away packages. A package release system generally provides a way for each package to be securely picked up by a drone. Multiple packages may be stacked for delivery without crushing the packages or using an attaching method that may damage the package. Minimal human intervention is also desired for truck top package release systems as the drivers should be focusing on the truck and the drone.

The stacked package release system described herein generally enables an Unmanned Aircraft System (UAS) to pick up a package from a stack of packages while securing the remaining packages. The stacked package release system may be utilized with delivery trucks or vans and can be accessible from the exterior of the truck (e.g., from a roof of the truck) so that a UAS can retrieve a package for delivery from the truck or van. The package release system may securely hold multiple packages with arms until a UAS retrieves a package. When a top package is removed, the arms of the system may move down (e.g., in a scissor motion) to allow the next box in the stack to be retrieved. In some embodiments, the arm assembly has the arms extended up until a package is ready to be removed. Each package may be configured with a hanger or hook that the UAS can connect with and/or hook on to. Packages may be stacked in the package release system with the hanger of at least the topmost package accessible. The width of the holder arms may be adjusted to the standard size of the packages. The arms may be controlled by motorized hinges which may bring the arms down as a package is removed to allow for subsequent package retrieval. As each package is removed, the arms may automatically go down in proportion to the height of the stack of packages. A truck may use a moonroof to elevate the packages and the release system from inside the truck to the roof. A UAS may fly above the truck to pick up a package by coupling its hook with a hanger on the box. The UAS may deliver the package and then return to the truck for another package.

The system described herein may generally enable a UAS and/or air drone to pick up a package stacked on the top of a truck or a building while securing the remaining packages. The package release system may securely hold the packages with arms until a drone swoops down and catches the box hanger loop with its hook and carries the package away. When the top box is removed, the arms may move down in a scissor motion to expose the hanger on the next box in the stack.

Generally, the package release system may automatically extend and lower its arms depending on the stack size of the packages. The stack size may be determined by the summation of the heights of all boxes still in the stack. In some embodiments, each boxes' individual heights and the order in which they are stacked may be used to determine the stack height as packages are added and/or removed.

Referring now to FIG. 1, a system for releasing packages for UAS retrieval is shown. The package release system 100 includes a control circuit 110 coupled to powered hinges 120 which drives the arms 130. In some embodiments, the package release system 100 further includes a sensor 140 coupled to the control circuit 110.

The package release system 100 may comprise a system mounted on top of a vehicle, a system placed in an open lot, a system position on top of a building, etc. In some embodiments, the package release system 100 may be placed on a movable platform for retracting the system into a building and/or vehicle. In some embodiments, the package release system 100 may be a standalone unit and/or may communicate with a central computer and/or a server to retrieve information such as package height and UAS activity. Generally, the package release system 100 may be configured to secure a stack of packages while making the top package available for UAS retrieval.

The control circuit 110 may comprise a central processing unit, a processor, a microprocessor and the like. The control circuit 111 may be configured to execute computer readable instructions stored on a computer readable storage memory (not shown). The computer readable storage memory may comprise volatile and/or non-volatile memory and have stored upon it a set of computer readable instructions which, when executed by the control circuit 110, cause the system to raise and lower arms 130 based at least on the height of the stacked packages. In some embodiments, the memory may further store information related to package dimensions and/or UAS schedules. In some embodiments, the control circuit 110 may control the arms 130 via the powered hinges 120 in accordance with one or more steps described with reference to FIGS. 2 and 3A-D herein.

The arms 130 comprises two or more elongated members that are configured to secure a stack of packages surrounded by the arms 130. In some embodiments, the arms 130 may comprise bars that are generally vertical when in fully extended position. In some embodiments, the arms may comprise rigid or semi-rigid material such as metal, wood, plastic, rubber, etc. In some embodiments, each arm may comprise a rigid or semi-rigid cylindrical and/or flat bar. In some embodiments, each arm may comprise one or more joints that fold when the arms 130 are pivoted by the powered hinges 120. In some embodiments, the system may include four arms for securing square and/or rectangular packages. The packages may be placed with each corner pointing towards one arm or with each vertical side facing one arm.

The powered hinges 120 may generally be hinges that are configured to move the arms 130 relative to a base as controlled by the control circuit 110. Each hinge may be coupled to an arm on one end and one of a base frame, a base platform, a vehicle, a pavement, and a building structure on the other end. The powered hinges 120 may generally to configure to allow the arms 130 to pivot in at least one axis. In some embodiments, the powered hinges may comprise one or more of a knuckle joint, a turnbuckle, a pin joint, a cotter joint, a bolted joint, a screw joint, and the like. In some embodiments, the powered hinges 120 may be configured to hold each arm vertically to the ground in a fully extended position and pivot each arm in at least one direction to lower the arms. In some embodiments, the powered hinges 120 are driven together to cause each arm to pivot approximately the same amount. In some embodiments, each of the powered hinges 120 may be individually controlled by the control circuit 110. Description of an example of arms 130 and powered hinges 120 configuration is provided in more detail with reference to FIGS. 3A-D herein.

In some embodiments, the package release system may further include an adjustable base frame coupled to the powered hinges 120. The adjustable base frame may include two or more extendable bars that may extend and retract to adjust the distances between each of the arms 130 to accommodate packages of different sizes and dimensions. For example, the adjustable base frame may comprise a rectangular frame with at least two extendable sides and each powered hinge and arm may be coupled to a corner of the rectangle. In another example, the adjustable base frame may comprise two extendable bars that cross each other and can rotate relative to each other.

In some embodiments, the package release system 100 may include a sensor 140 communicatively coupled to the control circuit 110. In some embodiments, the sensor 140 may comprise a scanner for scanning an identifier on the packages. For example, the scanner may comprise a camera, an optical sensor, a barcode scanner, a radio frequency identification (RFID) tag scanner, etc. In some embodiments, the sensor 140 may determine package dimension and height information from the scan. For example, the sensor 140 may comprise an optical scanner for reading a label on the package that provides the package's dimension. In some embodiments, the sensor 140 may read an identifier (e.g. barcode, shipping label, etc.) from the package, and use the identifier to retrieve package dimension information from a local storage and/or from a central computer system such as a shipment management system. In some embodiments, the sensor 140 may directly sense the height of one or more packages. For example, the sensor 140 may comprise one or more of an optical sensor, a range sensor, and a laser distance sensor. The sensor 140 may measure the height of the stack of packages as the packages are added to the stack and/or as the packages are removed from the stack to determine the current height of the stack and/or each package. In some embodiments, the sensor may comprise one or more of a weight sensor, a wireless receiver, an optical sensor, and a range sensor for detecting that a first package has been removed. For example, a weight sensor may be included in the base of the package release system 100 to detect any weight change in the stack of packages secured by the arms 130. In some embodiments, the sensor 140 may be attached to one or more of the arms 130, the control circuit 110, and a base of the package release system 100. In some embodiments, the sensor 140 may comprise a handheld scanner that may be used to scan the packages when the packages are added to the stack. In some embodiments, the package release system 100 may include an additional structure for supporting the sensor 140. For example, a sensor 140 may be supported by pole a distance away from the arms 130. Generally, the sensor 140 may provide information to the control circuit 110 to determine when and how much the arms 130 should be extended and/or lowered to secure the packages and/or allow the packages to be retrieved by UASs.

In some embodiments, the package release system 100 system may further include a communication device for communicating with a central server. The communication device may be a wired or wireless communication interface such as a data port, a wi-fi transceiver, a local area network transceiver, and the like. In some embodiments, the server may be a shipment tracking server that keeps track of the packages, including which packages should be in each of a plurality of package release systems. The server may provide package height information to the package release system 100 based on tracking the packages designated to be placed in the package release system 100. In some embodiments, the central server may further keep track of the locations of the UASs. For example, the server may know that a UAS is approaching the package release system 100 and instruct the package release system 100 to lower the arms 130 accordingly. In another example, after a UAS successfully retrieves a package, the server may send a message to the package release system 100. a UAS Referring now to FIG. 2, a method for releasing packages for retrieval by an unmanned aerial system is shown. Generally, the method shown in FIG. 2 may be implemented with a processor based device such as a control circuit, central processor, and the like. In some embodiments, the method shown in FIG. 2 may be implemented with the control circuit 110 and/or a processor based server device communicating with the control circuit 110. Generally, the steps shown in FIG. 2 may be performed by one or more of a central server and a control circuit of a package release system In step 210, the system detects a height of a package(s) stacked vertically within the arms of the package release system. Prior to step 210, a plurality of packages may be stacked vertically between the arms of the package release system either by a human or a stacking machine. In some embodiments, the height of one or more packages may be provided by a central server that manages the delivery of packages. In some embodiments, an identifier (e.g. barcode, RFID) of each package may be scanned when the packages are placed into the package release system. The system may retrieve and store the dimension information using the identifier. In some embodiments, the packages may contain markings identifying its dimensions (e.g. shipping label, box marking), and the system may read the dimensions off of the packages with an optical scanner. In some embodiments, the system may comprise a height sensor such as an optical sensor, a range sensor, and laser distance sensor for directly measuring the height of one or more of the package and or stacked height of the packages.

In step 230, the system determines a first lowered position for the plurality of arms surrounding the packages. The first lowered position may correspond to an arm position at which the arms do not obstruct an unmanned aerial vehicle from coupling with a coupling structure on a topmost package of the stack of packages. In some embodiments, the system may determine the height of the topmost package and/or the height of the stack of packages without the topmost package. In some embodiments, the first lowered position may correspond to an arm position at which the top of the arms is equal or lower than one or more of: the top of the coupling structure attached to the topmost package, the top plane of the top package, a set distance (e.g. 5 inches) below the top of the package or the coupling structure, a percentage distance (e.g. 50%) below the height of the package, a bottom plane of the top package, a set or percentage distance above or below the top of the next package in the stack, etc. In some embodiments, the first lowered position may correspond to a position at which each arm intersects the plane of the top surface of the topmost package at a location that is a predetermined distance away from the top package. For example, the first lowered position may cause the arms to open enough to provide enough clearance (e.g. a set width wider than the width of the lower portion of the UAS) for the UAS to approach and engage the package. Generally, the system may be configured to select a height for a first lowered position that does not obstruct a UAS from engaging with a coupling structure while securing the boxes below the topmost box during the retrieval. Generally, the first lowered height may be dynamically determined based on the dimensions of the packages placed between the arms of the package release system.

In step 240, the system causes the powered hinges to pivot the arms to the first lowered position determined in step 230. In some embodiments, the control circuit sends an amount of power to the powered hinges to rotate the hinges to lower the arms to the first lowered position. In some embodiments, each powered hinges may be driven by the same signal from the control circuit or may be individually driven by the control circuit.

In some embodiments, prior to step 240, the package release system may start off at a fully extended position at which the arms are substantially vertical to the ground. In some embodiments, a package may be retrievable when the arms are fully extended and steps 220-240 may occur after that package is removed. In some embodiments, step 240 may be triggered when a package is removed to make the next package in the stack available for retrieval. The system may detect that a package has been removed via one or more of a weight sensor, a wireless receiver, an optical sensor, and a range sensor. In some embodiments, a central system may notify the package release system that a package has been successfully retrieved based on the information received from the retrieving UAS. In some embodiments, step 240 may be triggered when a UAS approaches to retrieve a package. For example, a delivery management system may notify the package release system that a UAS is approaching and the arms may be lowered just prior to the arrival of the UAS. In another example, the package release system may sense the approach of a UAS via an optical sensor and/or a short range communication signal (e.g. Bluetooth, Wi-Fi, Infrared, etc.) and lower the arms in response. In some embodiments, the package release system may distinguish UASs approaching it or another package release system nearby via the content of the short range communication signal. In some embodiments, the package release system may lower the arms based on a previously stored retrieval schedule of the UASs (e.g. first retrieval at 2:30 pm, second retrieval at 2:55 pm, etc.).

In some embodiments, after step 240, the system may maintain the arms at the first lowered position until a package is removed and/or a UAS approaches to pick up the next package. In some embodiments, after the topmost package is removed, the process may return to step 220 for the remaining packages. For example, a second lowered position may be determined similarly to make the next package in the stack available for retrieval after the topmost package is removed. The system may lower the arms to the second lowered position as soon as the topmost package is removed and/or when a UAS is approaching to retrieve the second package. In some embodiments, after the first package is removed, the systems may return the arms to a fully extended position until a UAS approaches to retrieve the second package.

In some embodiments, packages may be added to the stack of packages in between retrievals, and the system may calculate a second lowered position based on the new height of the added package.

Next referring to FIGS. 3A-D, illustrations of a package release system are shown. FIG. 3A shows an empty package release system in a fully extended position. The system includes arms 311, 312, 313, and 314, each controlled by powered hinges 321, 322, 323, and 324 respectively. The powered hinges 321-324 are coupled to a base frame 330. In some embodiments, two or more sides of the base frame 330 may be extendable to adjust the distance between the arms 311-314 to accommodate packages of different dimensions.

In FIG. 3B, a stack of packages 331, 332, and 333 are stacked within the arms 311-314 of the package release system. The packages 331-333 each include a coupling structure 341, 342, and 343 respectively. The coupling structures 341-343 may comprise a hook, a hanger, a loop, etc. that are configured to couple to a UAS while the UAS is in flight. In FIG. 3 B, the packages 331-333 are stacked such that the coupling structures 341-343 face different directions alternatively. The packages may generally be stacked such that the coupling structure of each package in the stack is extended. In some embodiments, the top package 331 may be retrievable by a UAS while the arms 311-314 are fully extended as shown in FIG. 3B. In some embodiments, the control circuit may lower the arms to the position shown in FIG. 3C to make the top package 331 retrievable.

In FIG. 3C, the top package 331 has been removed from the stack and the arms 311-314 are lowered to a first lowered position. In the first lowered position, the first pair of arms 311 and 312 are pivoted toward each other in the same plane and cross each other as the tops of the arms are lowered. The other pair of arms 313 and 314 are similarly lowered as they cross each other. Generally, the arms are lowered to expose the coupling structure 342 of the second package 332 for retrieval by a UAS.

In FIG. 3D, the second package 332 is removed from the stack and the arms 311-314 are lowered to a second lowered position. In the second lowered position, the arms 311-314 are pivoted further away from the vertical position to lower the tops of each arm. The arms 311-314 are lowered to expose the coupling structure 343 of the third package 333 for retrieval by a UAS.

The configuration of the package release system in FIGS. 3A-D are provided as an example only. A package release system may include two or more arms, and the arms can pivot in different directions without departing from the spirit of the present disclosure. For example, the arms may each pivot in a different plane towards a different one of the arms. In some embodiments, the arms may include one or more joints that fold when the arms are pivoted. For example, each arm may include a top portion that folds inward as the lower half of the arm is pivoted outward. In some embodiments, the powered hinges 321-324 may be secured to a solid platform instead of and/or in additional to the base frame 330. While the packages 331-333 are shown to be positioned with each vertical edge aligned with an arm 311-314, in some embodiments, the packages 331-334 may be positioned such that the arms are adjacent to a vertical side of the package. While FIGS. 3A-D shows a stack of three packages and two lowered positions, a package release system may surround a stack of any height and any number of packages without departing from the spirit of the present disclosure. The number of lowered positions may be based on the number of packages placed in the package release system. Generally, each lowered positions may be determined dynamically based on the dimensions of the packages between the arms. While each of the packages 331-333 are shown as packages of substantially similar size and shape, in some embodiments, the packages may be of any shape and may vary in shape and/or dimension. For example, a package release system may be configured to hold packages that are rectangular, cylindrical, irregularly shaped, etc. by adjusting the placement and/or the configuration of the arms.

Figure 4A:
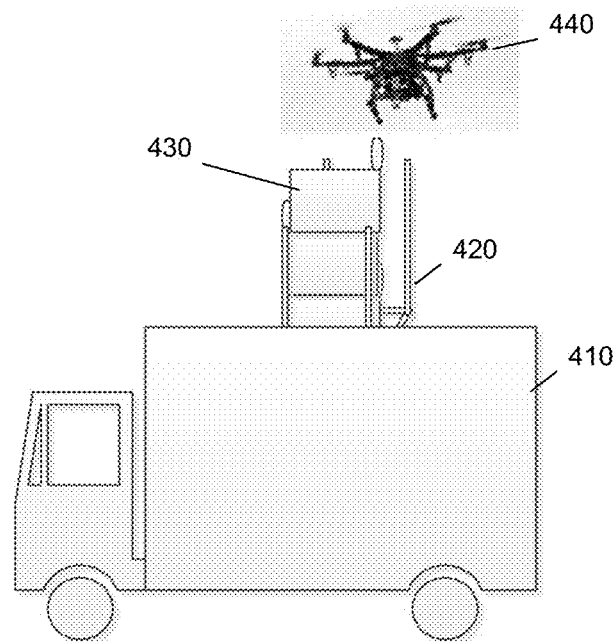
FIGS. 4A and 4B are illustrations of a vehicle mounted package release system in accordance with several embodiments.
Figure 4B:
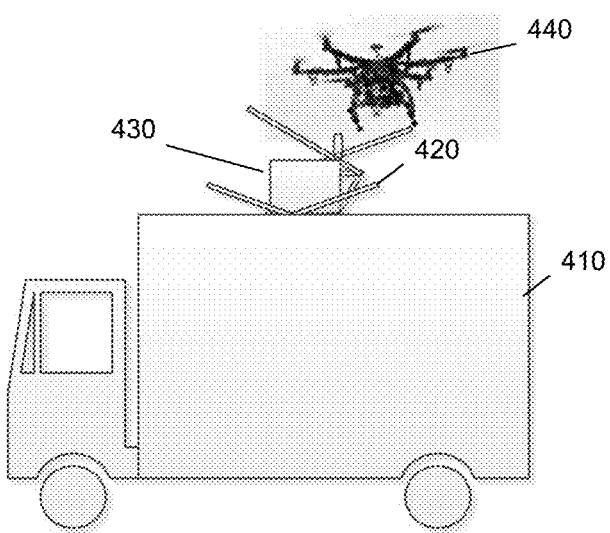

Next referring to FIGS. 4A-B, illustrations of a vehicle mounted a package release system are shown. In FIG. 4A, a package release system 420 holding packages 430 for retrieval by a UAS 440 is mounted on a vehicle 410. FIG. 4A show the package release system 420 in a fully extended position. In some embodiments, the package release system 420 and/or the stacked packages 430 may be retractable into the vehicle 410 through a movable platform. The vehicle may be a delivery vehicle such as a semi-trailer, a truck, a van, and the like. While FIG. 4A shows the package release system 420 being positioned on top of the vehicle 410, in some embodiments, the package release system 420 may be mounted on a side or the back of the vehicle 410. The vehicle may comprise one or more of a delivery truck, trailer, van, etc.

In FIG. 4B, the package release system 420 is lowered to expose the last package in the stack for retrieval by the UAS 440. The UAS 440 may comprise a coupling structure such as a hook for coupling with the coupling structure on the package 430. The UAS 440 may couple with the package 430 while in flight, lift the package 430, and began to travel towards a delivery destination while carrying the package 430.

When hovering over the packages, a UAS can produce significant downdraft that can cause the packages to shift and/or tip over. When the topmost package is lifted away by the UAS, the friction between the first package and the second package may also cause the stack of packages to tip over. With the systems and methods described herein, a stack of packages may be secured in place while the UAS couples to the topmost package of the stack and removes the package for delivery. The system may be configured to automatically adjust the height of the arms as packages are added and/or removed from the stack.

In one embodiment, an apparatus for releasing packages for retrieval by an unmanned aerial system comprises a plurality of arms configured to surround a plurality of packages stacked vertically in an extended position, a plurality of powered hinges at a base of each of the plurality of arms, and a control circuit coupled to the plurality of powered hinges. The control circuit being configured to: determine a height for a first lowered position for the plurality of arms at which the plurality of arms do not obstruct an unmanned aerial vehicle from coupling with a coupling structure on a first package of the plurality of packages positioned at a top of the plurality of packages, and cause the plurality of powered hinges to pivot the plurality of arms from the extended position to the first lowered position.

In one embodiment, a method for releasing packages for retrieval by an unmanned aerial system comprises: determining a height of a plurality of packages stacked vertically, determining a first lowered position for a plurality of arms surrounding the plurality of packages based on the height of the plurality of packages, wherein in the first lowered position, the plurality of arms do not obstruct an unmanned aerial vehicle from coupling with a coupling structure on a first package of the plurality of packages positioned at a top of the plurality of packages, and causing a plurality of powered hinges to pivot the plurality of arms to the first lowered position.

In one embodiment, a system for package delivery comprising: a plurality of packages stacked vertically, each package having an coupling structure extending upwards from the package, an unmanned aerial system having a lift structure configured to become coupled with the coupling structure while in flight, and a release system comprising: a plurality of arms surrounding the a plurality of packages, and a control circuit coupled to the plurality of arms and configured to pivot the plurality of arms such that the plurality of arms do not obstruct the unmanned aerial system from coupling with the coupling structure on a first package of the plurality of packages while securing at least a second package of the plurality of packages positioned under the first package.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An apparatus for releasing packages for retrieval by an unmanned aerial system comprising:
   a plurality of arms configured to surround a plurality of packages stacked vertically in an extended position;
   a plurality of powered hinges at a base of each of the plurality of arms; and
   a control circuit coupled to the plurality of powered hinges and configured to:
      cause the plurality of powered hinges to lower the plurality of arms from the extended position to a first lowered position at which the plurality of arms do not obstruct an unmanned aerial vehicle from coupling with a coupling structure on a first package of the plurality of packages positioned at a top of the plurality of packages.

2. The apparatus of claim 1, wherein the plurality of arms comprises two pairs of arms and the plurality of powered hinges that causes arms in each pair of arms to pivot in the same plane toward each other and cross each other as tops of the arms are lowered with the pivot.

3. The apparatus of claim 1, wherein in the first lowered position, a top tip of each of the plurality of arms are lower than a plane of a top surface of the first package.

4. The apparatus of claim 1, wherein at the first lowered position, each arm intersects a plane of a top surface of the first package at a location a predetermined distance away from the first package.

5. The apparatus of claim 1, further comprising: one or more of an optical sensor, a range sensor, and a laser distance sensor for determining a height of the plurality of packages.

6. The apparatus of claim 1, wherein in the extended position, the plurality of arms are generally vertical from a ground.

7. The apparatus of claim 1, wherein the plurality of arms are coupled to a delivery vehicle.

8. The apparatus of claim 1, wherein the control circuit is further configured to:
   cause the plurality of powered hinges to pivot the plurality of arms from the first lowered position to a second lowered position at which height the plurality of arms do not obstruct the unmanned aerial vehicle from coupling with a coupling structure on a second package of the plurality of packages positioned at a top of the plurality of packages after the first package is removed.

9. The apparatus of claim 8, wherein the control circuit is further configured to:
   determine that the first package has been removed from the plurality of packages prior to causing the plurality of powered hinges to pivot the plurality of arms to the second lowered position.

10. The apparatus of claim 9, further comprising: one or more of a weight sensor, a wireless receiver, an optical sensor, and a range sensor for detecting that the first package has been removed.

11. The apparatus of claim 1, further comprising: a memory device storing height information for the plurality of packages surrounded by the plurality of arms, wherein the first lowered position is determined based on the height information of the plurality of packages.

12. The apparatus of claim 11, further comprising: an optical scanner for scanning an identifier on each of the plurality of packages, wherein the control circuit is configured to obtain package dimension information based on the identifier on each of the plurality of packages.

13. The apparatus of claim 1, further comprising a base frame, wherein the plurality of hinges couples the plurality of arms to the base frame.

14. The apparatus of claim 13, wherein the base frame comprises extendable bars for adjusting positions of the plurality of arms.

15. A method for releasing packages for retrieval by an unmanned aerial system comprising:
   surround a plurality of packages that are stacked vertically with a plurality of arms coupled to a plurality of powered hinges, wherein the plurality of arms are in an extended position; and
   cause, with a control circuit, the plurality of powered hinges to lower the plurality of arms from the extended position to a first lowered position at which the plurality of arms do not obstruct an unmanned aerial vehicle from coupling with a coupling structure on a first package of the plurality of packages positioned at a top of the plurality of packages.

16. The method of claim 15, further comprising:
   determining heights of the plurality of packages by retrieving height information for each of the plurality of packages and determining a total height of the plurality of packages stacked vertically.

17. The method of claim 15, wherein at the first lowered position, a top tip of each of the plurality of arms are lower than the height of the plurality of packages.

18. The method of claim 15, further comprising:
   causing the plurality of powered hinges to pivot the plurality of arms to a second lowered position at which the plurality of arms do not obstruct the unmanned aerial vehicle from coupling with a coupling structure on a second package of the plurality of packages positioned at a top of the plurality of packages after the first package is removed.

19. The method of claim 18, further comprising:
   determining that the first package has been removed from the plurality of packages prior to causing the cause the plurality of powered hinges to pivot the plurality of arms to the second lowered position.

20. A system for package delivery comprising:
   a plurality of packages stacked vertically, each package having a coupling structure extending upwards from the package;
   an unmanned aerial system having a lift structure configured to become coupled with the coupling structure while in flight; and
   a release system comprising:
      a plurality of arms surrounding the plurality of packages; and
      a control circuit coupled to the plurality of arms and configured to pivot the plurality of arms such that the plurality of arms do not obstruct the unmanned aerial system from coupling with the coupling structure on a top package of the plurality of packages.

* * * * *

UNITED STATES PATENT AND TRADEMARK OFFICE
CERTIFICATE OF CORRECTION

| | | |
|---|---|---|
| PATENT NO. | : 10,239,616 B2 | Page 1 of 1 |
| APPLICATION NO. | : 16/035987 | |
| DATED | : March 26, 2019 | |
| INVENTOR(S) | : Donald R. High et al. | |

It is certified that error appears in the above-identified patent and that said Letters Patent is hereby corrected as shown below:

In the Claims

Claim 19, Column 10, Line 52, after "prior to causing" delete "the cause."

Signed and Sealed this
Sixth Day of August, 2019

Andrei Iancu
*Director of the United States Patent and Trademark Office*